United States Patent [19]

Hunt

[11] 4,223,755
[45] Sep. 23, 1980

[54] SUPPRESSING EJECTION OF WATER AND OTHER SURFACE MATERIAL FROM AIR CUSHION VEHICLES

[75] Inventor: Rowland D. Hunt, Calgary, Canada

[73] Assignee: Hoverlift Systems Ltd., Calgary, Canada

[21] Appl. No.: 926,933

[22] Filed: Jul. 21, 1978

[51] Int. Cl.² .............................................. B60V 1/16
[52] U.S. Cl. .................................................... 180/123
[58] Field of Search ................ 180/122, 123, 119–121, 180/126–128, 116

[56] References Cited

U.S. PATENT DOCUMENTS

| 3,106,261 | 10/1963 | Mackie | 180/116 |
| 3,209,847 | 10/1965 | Beardsley | 180/128 X |
| 3,321,037 | 5/1967 | Cockerell | 180/123 |
| 3,465,844 | 9/1969 | Page et al. | 180/127 X |
| 3,550,718 | 12/1970 | Knuth | 180/116 X |
| 3,578,100 | 5/1971 | Marchetti et al. | 180/126 |
| 3,791,478 | 2/1974 | Remon-Beauvair et al. | 180/121 |

FOREIGN PATENT DOCUMENTS 2005616  4/1976  United Kingdom ..................... 180/123

*Primary Examiner*—John J. Love
*Assistant Examiner*—Norman L. Stack
*Attorney, Agent, or Firm*—Sidney T. Jelly

[57] ABSTRACT

To reduce the amount of water or other surface material issuing at the periphery of an air cushion vehicle, a flexible barrier is suspended at the vehicle periphery lateral to the cushion containing means—usually a flexible skirt. The spray or other material is trapped between the vehicle periphery and the barrier, with water or other material dropping down and air venting through apertures at the top of the barrier. Weight can be added to the lower part of the barrier to assist in maintaining the barrier down.

6 Claims, 5 Drawing Figures

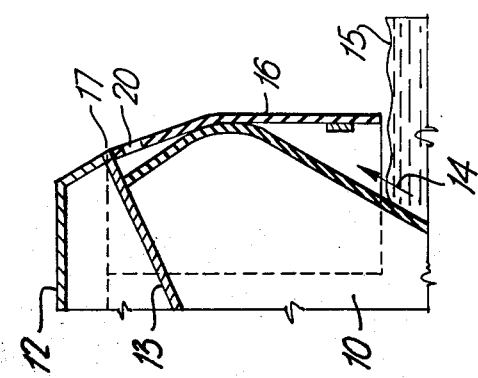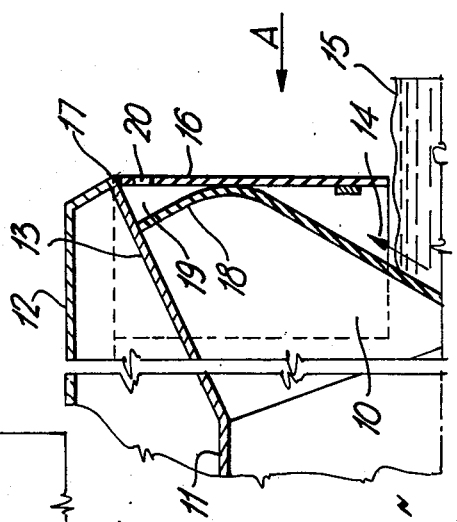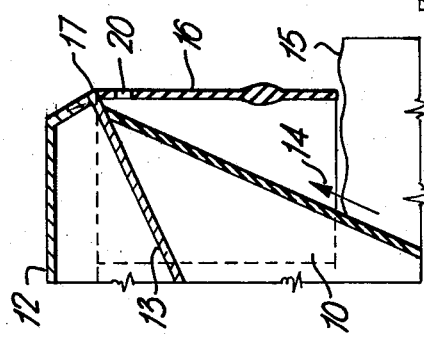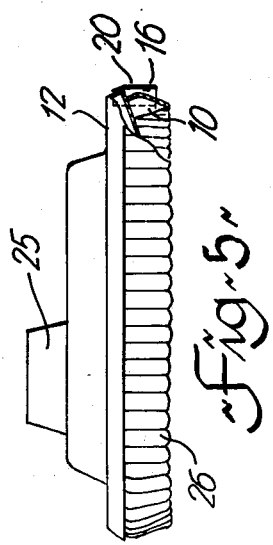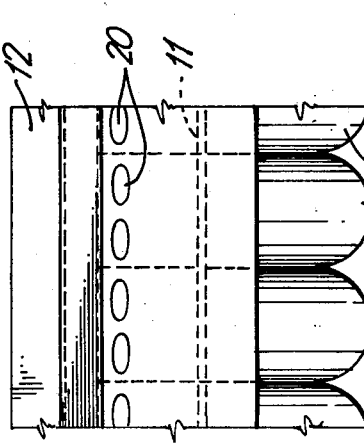

SUPPRESSING EJECTION OF WATER AND OTHER SURFACE MATERIAL FROM AIR CUSHION VEHICLES

This invention relates to the suppressing of the ejection of water or other surface material from air cushion vehicles when operating over water or land surfaces and to apparatus for such suppression.

When an air cushion vehicle is operating over water, or land surfaces, the leakage of air from beneath the vehicle causes the ejection of considerable water spray or dust, small stones or similar surface material. This can be objectionable for various reasons and reduction of the amount of material ejected is desirable.

The present invention provides a barrier at the vehicle periphery which will deflect ejected material downwards and vent air without producing further ejection.

The invention will be readily understood by the following description of one embodiment, by way of example, of a vehicle on a water surface, in conjunction with the accompanying drawings, in which:

FIG. 1 is a cross-section through the lower part of a vehicle periphery;

FIG. 2 is a view in the direction of arrow A in FIG. 1, of a short section of the vehicle periphery;

FIGS. 3 and 4 illustrate alternate peripheral shapes of a flexible skirt;

FIG. 5 is a side view of a vehicle, partly in section, to illustrate the application of the invention.

As illustrated in FIG. 1, a flexible skirt 10 is attached to the bottom surface 11 of the hull structure 12 of the vehicle. The skirt 10 is conveniently formed by a plurality of segments, as described in Canadian Pat. No. 795,661, issued Oct. 1, 1968. However other forms of skirt can be provided. The skirt may extend for the entire vehicle periphery, or for only a part. To permit the skirt to collapse and not be trapped between the hull structure and the ground when the vehicle is inoperative, that is in the "off-cushion" condition, the peripheral part 13 of the hull structure is inclined upwards and outwards to provide clearance. The actual detail of attachment of the skirt segments to the vehicle structure can vary and is no part of the present invention.

When operating over water, air escapes beneath the skirt 10, flowing up the outside of the skirt as indicated by the arrow 14, the water level being indicated at 15. This air flow creates considerable spray. The present invention, as illustrated in FIGS. 1 and 2, comprises a flexible barrier, such as a rubber flap or skirt 16, which depends from the edge 17 of the hull structure 12. The top part of the outer side of the skirt is inclined inwards, at 18 and a small chamber 19 is formed between the skirt 10 and the flap 16. The flap 16 extends below the level of the inwardly inclined part of the skirt and a convergent passage is formed between the skirt 10 and the flap 16. The spray ejects into this convergent passage and is prevented from issuing outwards from the vehicle. Some of the spray is deflected downwards towards the water surface, and some will breakdown, water falling down to the water surface and air venting through apertures or vents 20 formed at the top of the flap 16. Any spray entering the chamber 19 will also breakdown with water draining down and air escaping through the apertures or vents 20.

The actual peripheral shape, or cross-section, of the outer part of skirt 10 can vary from that illustrated in FIG. 1. FIGS. 3 and 4 illustrate alternative shaping of the skirt upper portion. In FIG. 4, the flap 16 is shown curving outwards and downwards, beyond the periphery of the skirt. The flap 16 may also take up such a curve, or one somewhat similar, with skirts having their upper parts shaped as in FIGS. 1 and 3. The essence is that the flap acts partly as a deflector and also breaks down the spray, water dropping down and air escaping out through the vents or apertures 20. Considerable variation in the detailed form of the skirt 10 and flap 16 can occur without prejudice to the spray suppression effect.

The flap 16 can be in the form of relatively short sections connected together and extending around the vehicle periphery. It may be that with some forms of vehicle, a flap will only be required for particular parts of the vehicle periphery. To assist in maintaining the flap in staying in the downward direction, a ballast strip or strips 21 can be attached to the flap 16. The apertures or vents 20 can be elongate holes in the flap, possibly having reinforced edges, or the flap can comprise a top strip which is attached to the vehicle and a further main part which hangs down past the vehicle periphery, the main part attached or connected to the top strip at spaced apart positions leaving gaps which form the vents or apertures 20.

FIG. 5 illustrates a typical form of vehicle, with hull structure 12, superstructure 25 containing lift fans, and other power services and a segmented flexible skirt 26. The rear portion is shown in cross-section to illustrate the application of the invention. By a vehicle is meant any form of load carrying device supported over a surface, and in the present invention over a water surface. The air cushion may be formed under the whole, or part of the vehicle body.

When operating over a land surface, which includes ice, a similar situation exists in that as air escapes beneath the skirt, dust stones or ice on the surface are energized by the air flow and considerable clouds of dust or fine ice can occur. Stones may be hurled considerable distances. The invention acts in a similar manner as with water. The barrier 16 intercepts the dust, ice or other material, which falls to the surface, air escaping via the vents 20. For more effective suppression, the barrier may be caused to extend to nearer the surface, than when over water. For water operation, the barrier could be raised, or just allowed to contact the water surface. The flow of air, and water, when over a water surface will tend to deflect the barrier to maintain it clear of the water surface when the vehicle is operative. When it is known beforehand whether a vehicle is to be operated predominantly over a water surface, or a land or ice surface, then the dimensions of the barrier can be made as desired and suitable.

What is claimed is:

1. Apparatus for suppressing ejection of water spray and the like from an air cushion vehicle, the vehicle comprising a hull structure and a flexible skirt attached to a lower surface of the hull structure, the flexible skirt having a downwardly and inwardly inclined portion for at least a lower part thereof and having a lower edge beneath which air can escape from a cushion space beneath the hull structure, and a flexible barrier attached to the periphery of the hull structure outside said skirt and extending downwardly, said inclined portion of said skirt and said flexible barrier defining a convergent passage, a plurality of closely spaced apertures extending along an upper part of said flexible barrier, and ballast means at a lower part of said barrier, the arrangement such that spray and the like issuing from beneath said lower edge of said flexible skirt is ejected into said convergent passage, impinging on said barrier, water separating and falling down inside said barrier to escape beneath said barrier, air escaping out through said apertures.

2. Apparatus as claimed in claim 1, said flexible skirt having an upper part inclined downwardly and outwardly from said hull structure and connected to said downwardly and inwardly inclined portion, said upper part of said skirt defining with an upper part of said barrier at least one chamber, said apertures communicating with said at least one chamber.

3. Apparatus as claimed in claim 1, said barrier comprising a top member and a lower member attached to said top member at spaced apart locations to provide openings between said locations to form said vents.

4. Apparatus as claimed in claim 1, said ballast means comprising a weight attached to said lower part.

5. Apparatus as claimed in claim 1, said barrier comprising a series of sections for positioning side-by-side at said periphery.

6. Apparatus as claimed in claim 1, said barrier comprising a continuous member to extend for at least a major part of the vehicle periphery.

* * * * *